United States Patent [19]
Montelin

[11] Patent Number: 5,577,326
[45] Date of Patent: Nov. 26, 1996

[54] OPTICAL SIGHT ARRANGEMENT FOR A FIREARM

[75] Inventor: Per Montelin, Genarp, Sweden

[73] Assignee: Aimpoint AB, Sweden

[21] Appl. No.: 325,180

[22] Filed: Apr. 27, 1995

[30] Foreign Application Priority Data

Sep. 9, 1993 [SE] Sweden .................. 9302923

[51] Int. Cl.⁶ ........................................ F41G 1/32
[52] U.S. Cl. .................. 33/241; 33/252; 356/251
[58] Field of Search ................. 33/255, 256, 259, 33/260, 253, 246, 241, 249, 252; 356/251, 252

[56] References Cited

U.S. PATENT DOCUMENTS

| | | | |
|---|---|---|---|
| 1,210,191 | 12/1916 | Moore | 33/255 |
| 1,260,545 | 3/1918 | Jackson | 33/253 |
| 1,327,141 | 1/1920 | Bumpas et al. | 33/255 |
| 2,128,526 | 8/1938 | Eslick | 33/241 |
| 2,208,452 | 7/1940 | Ferrel | 33/241 |
| 3,620,601 | 11/1971 | Waghorn | 356/251 |
| 3,816,005 | 6/1974 | Kirschner | 356/251 |
| 3,967,799 | 7/1976 | Muller | 356/251 |
| 4,689,910 | 9/1987 | Choate et al. | 33/255 |
| 4,764,011 | 8/1988 | Goldstein | 356/251 |

FOREIGN PATENT DOCUMENTS 485385  11/1953  Italy ........................ 33/246

Primary Examiner—Thomas B. Will
Attorney, Agent, or Firm—James Ray & Associates

[57] ABSTRACT

A red dot optical sight apparatus for a firearm having an optical element and a light emitting diode disposed at the focal point of the optical element, in which at least the optical element is pivotal between a lowered, inoperative position and a raised, operative position. The apparatus further includes spring biasing to assure that the optical element is in a precisely defined position when pivoted to the raised, operative position.

6 Claims, 3 Drawing Sheets

OPTICAL SIGHT ARRANGEMENT FOR A FIREARM

TECHNICAL FIELD

The present invention relates to an optical sight arrangement for a firearm, comprising a transparent, optical element and a light emitting means in the focal point of a concave, parabolical side of the element facing the user of the firearm.

BACKGROUND OF THE INVENTION

Sights of the above defined type can be called red dot sights: the light emitting means, normally a light emitting diode (LED), produces a red dot on the optical element, and by the characteristics of the element this dot is shown to the user of the firearm together with the target, on which the dot is to be placed for obtaining a hit.

Normally, the optical element and the LED are built into a housing with the optical element at one end thereof and a protective window at the other end; in this way a fully enclosed and protected design is obtained, which however has the drawback of being comparatively clumsy and add to height, volume and weight of the firearm.

In certain designs the housing is dispensed with, and the optical element rises from the top of the firearm unprotected and vulnerable, even when the firearm is not in use.

THE INVENTION

In a design of the latter type without a housing a marked improvement is obtained if according to the invention the optical element is movable between a lowered, inoperative position and a raised, operative position.

When not in use the optical element may be folded down against the firearm on which it is mounted, so that it is protected and does not unnecessarily add to the height and volume of the firearm.

In a practical embodiment the optical element is arranged in a lens holder, which is pivotably attached to the firearm and is movable from the lowered position to the raised position under the action of a spring. The lens holder is only to be released from its lowered position and will instantaneously flip up to its operative position ready for use.

The advantages of such a design are easy to imagine: For example, a policeman drawing his gun, provided with such a sight, from its holster instantaneously obtains a high-precision weapon when the lens element has flipped up, possibly automatically.

In a first embodiment, in order to attain a precisely defined, raised, operative position for the lens holder, which is of outmost importance for the precision of the sight, oblique surfaces, connected to the firearm and extending substantially in the axial direction thereof, are arranged to cooperate with corresponding oblique surfaces on the lens holder in its operative position.

The oblique surfaces connected to the firearm are preferably arranged on the outer/upper sides of the legs of a U-shaped member made of spring steel, the two legs having a certain spring bias apart. These surfaces may form an angle of 45° with the normal to the axial line of the firearm, but other angles are also possible.

One important aspect of the invention is that the lens element is protected when it is in its lowered position. In order to enhance this protection, the lens holder may be provided with a pivotable lid, which in the raised position of the lens holder is spring biased to an open condition and in the lowered position of the lens holder can be folded over the optical element to protect it and similarly spring biased to maintain the lid in such a closed condition.

In a second embodiment of the invention the optical element is arranged on a base cylinder of a lens holder, which cylinder for its pivotable mounting in the sight arrangement has pivot pins excentrically displaced in relation to the geometrical axis of the cylinder member and is exposed to a spring force directed towards said geometrical axis.

The pins are preferably arranged vertically below the geometrical axis of the base cylinder, whereas the base cylinder is provided with a vertical recess at each side and a U-shaped spring is arranged with its legs in the base cylinder recesses and with its base portion stationary in the sight arrangement.

Hereby the optical element can pivot in either direction and be returned by the spring to an accurate, operative position.

For the operation of a red dot sight electric current has to be supplied to the light emitting means. According to the invention means may be provided to switch off the light emitting means when the optical element is in its lowered position. The light emitting means may be switched on automatically, when the optical element is flipped up.

The different members of the sight arrangement according to the invention are preferably mounted on a frame, so that the sight may be delivered and mounted on the firearm as a unit.

THE DRAWINGS

The invention will be described in further detail below reference being made to the accompanying drawings, in which FIG. 1 is a side view of a first sight arrangement according to the invention with a lens holder containing an optical element shown in its raised, operative position, FIG. 2 is a top view of the same arrangement with the lens holder shown in its lowered, inoperative position, FIG. 3 is a slightly more detailed top view corresponding to FIG. 2 but only showing a portion of the arrangement, FIG. 4 is an end view of the same portion as is shown in FIG. 3 with the lens holder raised to its operative position, FIG. 5 is a side view of a second sight arrangement according to the invention with a lens holder containing an optical element shown in its raised operative position, FIG. 6 is a perspective view of a lens holder for the second sight arrangement according to the invention, FIG. 7 is a partly sectional view of the two members constituting the lens holder of FIG. 6, FIG. 8 corresponds to FIG. 7 but shows the two members in an assembled condition, and FIG. 9 is a top view of a part of the lens holder shown in FIG. 6.

DETAILED DESCRIPTION OF PREFERRED EMBODIMENTS

Optical sight arrangements as shown and described are intended for mounting on a firearm, such as a carbine, rifle or gun, or any other type of weapon. By suitable means, which are not described here, these arrangements may be mounted on an existing firearm without modifications to the weapon itself.

A first embodiment of the sight arrangement has a frame 1 provided with holes 2 for its attachment in a precisely defined position on the firearm (not shown).

A light emitting diode (LED) 3 or other light emitting means is mounted on the frame in a position to be described. The LED 3 may be protected by a cover 4.

Figure 1:
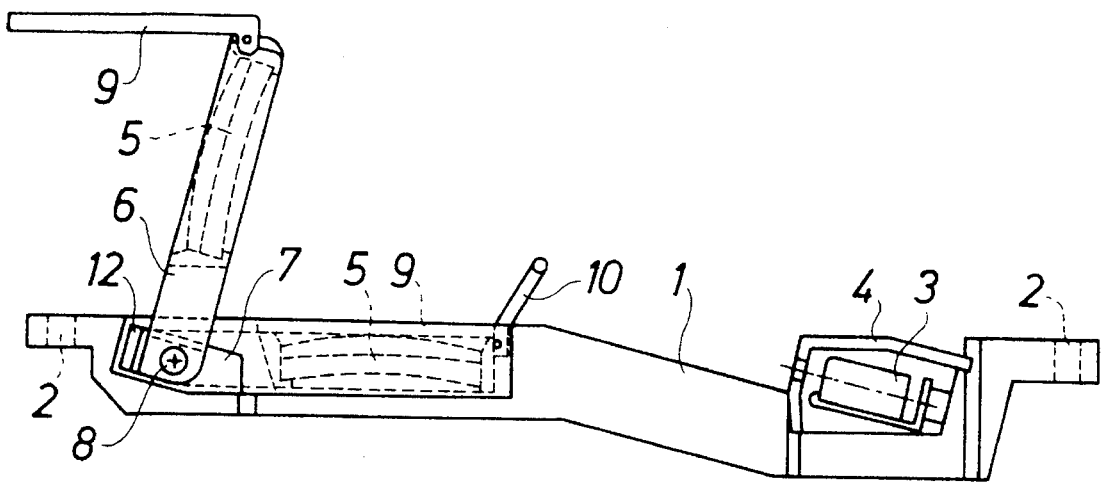
Figure 2:
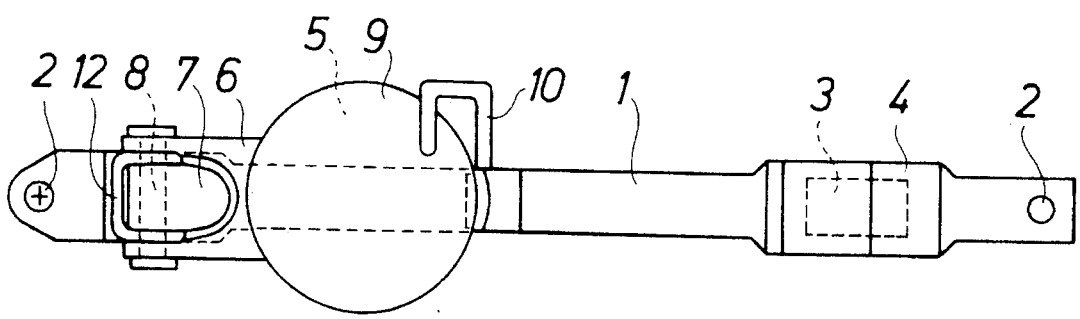

An optical element 5 to be further described is mounted in a lens holder 6. The lens holder 6 is pivotably mounted to an attachment 7 on the upper side of the frame by means of a shaft 8. In FIG. 1 the lens holder 6 is shown with full lines in its raised, operative position and with broken lines in its lowered, inoperative position. In FIG. 2 it is only shown in its lowered, inoperative position.

In order to protect the optical element 5 in the lowered, inoperative position, the lens holder 6 may at its edge remote from the shaft 8 be provided with a spring-biased lid 9, which may be folded over the optical element 5 as suggested in FIG. 2. As an alternative to the open position shown in FIG. 1, the lid 9 may extend to the right or backwards instead of to the left in order to be less vulnerable to branches and the like, when the firearm on which the sight arrangement is mounted is used in practice.

A pivotable catch 10 is provided in the frame 1 in order to hold the lens holder 6 with the lid 9 down in the inoperative condition shown in FIG. 2. When the catch 10 is removed, the lens holder 6 and the lid 9 will flip up to the positions shown in FIG. 1 under the action of means to be described below.

The optical sight arrangement with which the invention is concerned is of the so called red dot type, which per se is well known in the art. The LED 3 is arranged in the focal point of a concave, parabolical side in the optical element 5 (which in the shown case consists of two lenses mounted together). By the optical characteristics of the optical element 5 the image of the surroundings in front of the sight (to the left in FIGS. 1 and 2) will pass without deviations to the gunner's eye to the right in FIGS. 1 and 2 together with the red dot from the LED 3. This red dot is simply to be placed on the target.

Figure 3:
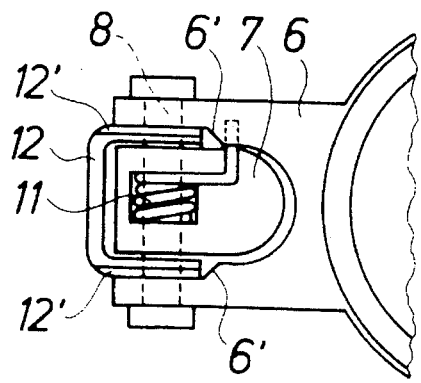
Figure 4:
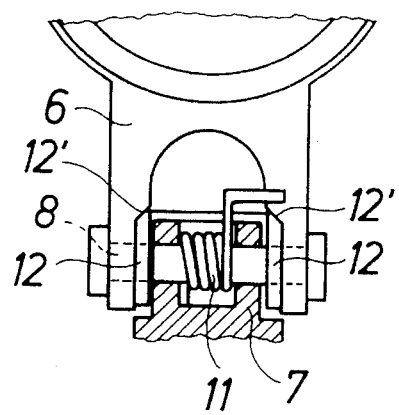

The arrangement for raising the lens holder 6 to the operative position shown in FIG. 1 is a torsion spring 11, only shown in FIGS. 3 and 4 for the sake of simplicity. This spring 11 is arranged around the shaft 8 in a recess in the attachment 7 and has an arm engaging the lens holder 6. Other spring arrangements are also conceivable.

It is of outmost importance that the lens holder 6, when it flips up to its operative position according to FIG. 1 under the action of the spring 11, attains a precisely defined position. This is obtained by means of the cooperation between the lens holder 6 and a U-shaped member 12 made of spring steel. This spring member 12 is placed around the attachment 7 on the frame 1 and is held in position by the shaft 8 passing through holes in its legs. In the rest position the two legs are directed slightly outwards, so that after mounting together with the lens holder 6 they are under a certain spring bias. The outer/upper sides of the spring member legs are slanted or provided with oblique surfaces 12', preferably forming an angle of 45°, whereas the lens holder 6 is provided with corresponding surfaces 6' (FIG. 3) for cooperation therewith.

When the lens holder 6 is flipped up, the two pairs of cooperating, oblique surfaces 6' and 12' engage and together define the desired position for the lens holder 6. By the spring bias of the legs of the spring member 12 a certain stabilizing force on the lens holder 6 is maintained also when the correct position has been attained.

Figure 5:
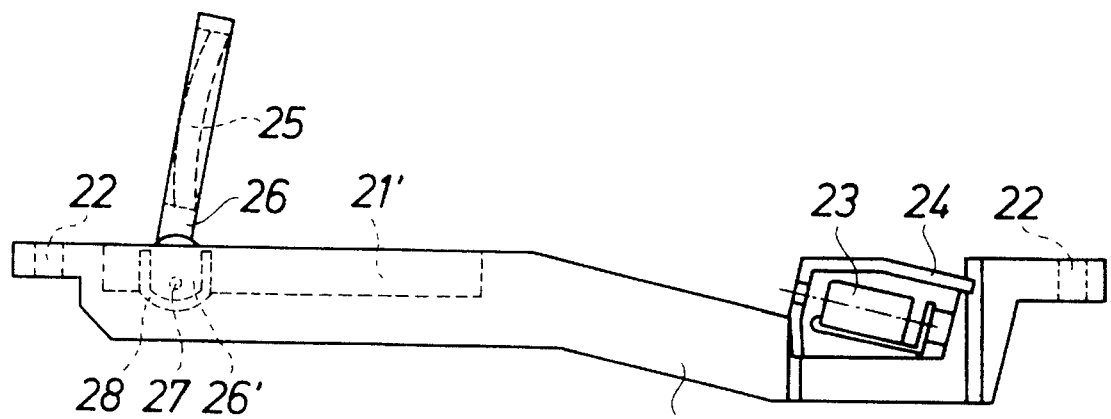
Figure 6:
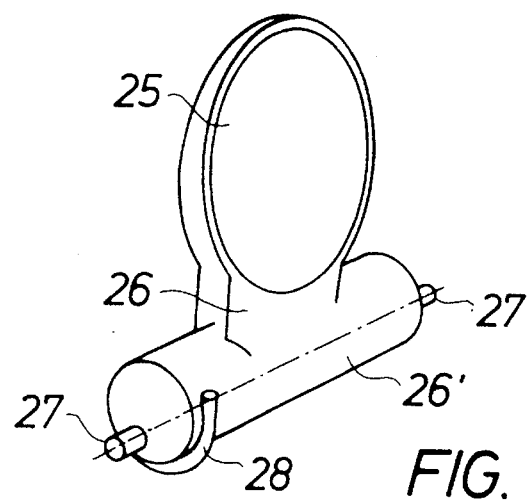

As shown in FIG. 5, the second embodiment at the sight arrangement has a frame 21 provided with holes 22 for its attachment in a precisely defined position on the firearm (not shown).

A light emitting diode (LED) 23 or other light emitting means is mounted on the frame in a position to be described. The LED 23 may be protected by a cover 24.

An optical element 25 to be further described is mounted in a lens holder 26. The lens holder 26 is provided with a pin 27 at each end of a base cylinder 26' for its pivotable mounting in side walls of a recess 21' in the upper side of the frame 21.

In a way to be described the lens holder 26 with the optical element 25 is biased to the operative position shown in FIG. 5.

The optical sight arrangement with which the invention is concerned is of the so called red dot type, which per se is well known in the art. The LED 23 is arranged in the focal point of a concave, parabolical side in the optical element 25. By the optical characteristics of the optical element 25 the image of the surroundings in front of the sight (to the left in FIG. 5) will pass without deviations to the gunner's eye to the right in FIG. 5 together with the red dot from the LED 23. This red dot is simply to be placed on the target.

Figure 7:
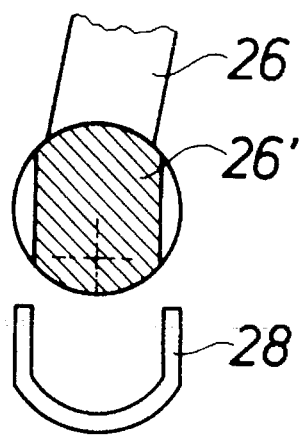
Figure 8:
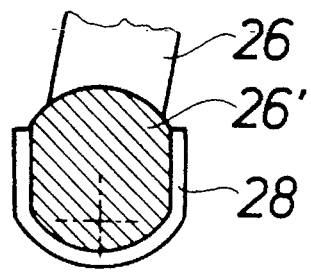
Figure 9:
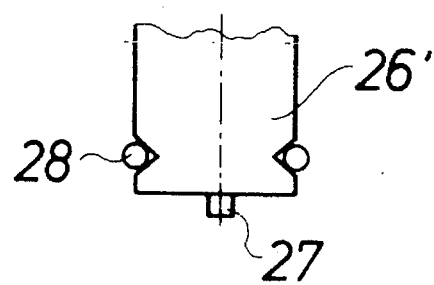

The means for biasing the lens holder 26 to the shown, substantially upright, operative position is a generally U-shaped spring 28. As appears most clearly in FIGS. 7 and 9, the two legs of the spring 28 are arranged in flat recesses in the base cylinder 26' of the lens holder 26. When mounted in the frame 21, the base portion of the U-shaped spring 28 is held stationary in the upright position as shown in FIG. 5 by means of a suitable notch in the frame 21, whereas the legs thereof are free to flex apart sidewise.

The pins 27, around which the base cylinder 26' will turn, are excentrically placed in relation to the geometrical central axis of the base cylinder 26', namely in the preferred embodiment vertically below said axis. This means that when the lens holder 26 is pivoted from its shown upright position, which for example happens if the lens holder is hit by an external object, such as a branch or the like, the legs of the U-shaped spring 28, especially the leg on the side towards which the lens holder is pivoted, will flex out and exert a biasing return force directed towards the central axis of the base cylinder. The lens holder 26 is accordingly returned to its shown operative position with high accuracy, which is of outmost importance for the proper operation of the sight.

Due to the double-sided nature of the design—two recesses on the base cylinder 26' and two legs on the U-shaped spring 28—the lens holder 26 will return with the same accuracy to the shown operative position irrespective of the direction of the pivotable movement.

Modifications of the second embodiment are possible within the scope of the appended claims. Especially, the shape and design of the spring may differ from what has been shown and described.

I claim:

1. An optical sight apparatus for a firearm, comprising a support structure attachable to such firearm, an optical element contained within a holding means which is pivotally attached to said support structure, said optical element having a first side disposable towards a user of such firearm, said first side having a concave, parabolic configuration with a predetermined focal point, and a light emitting means attached to said support structure disposed at said predetermined focal point, said holding means including a U-shaped portion having a first pair of legs members pivotally attached to said support structure and adapted to permit said optical element to be pivotal between a lowered, inoperative position and a raised, operative position, a first spring means adapted to cooperate with said holding means to bias and move said optical element to said raised, operative position, a U-shaped second spring means having a second pair of leg members disposed between said support structure and said holding means adapted to provide stability to said holding means when said optical element is in said raised, operative position, said holding means having at least one first oblique surface adapted to engage and cooperate with at least one second oblique surface on said U-shaped second spring means to assure said optical element is repeatably and precisely positioned when moved to said raised, operative position.

2. An optical sight apparatus, according to claim 1, in which said at least one first oblique surface is disposed on at least one of said first pair of leg members of said U-shaped portion of said holding means.

3. An optical sight apparatus, according to claim 1, in which said holding means is pivotal on said first pair of leg members which are pinned to said support structure, wherein said at least one first oblique surface is on at least one of said first pair of leg members.

4. An optical sight apparatus, according to claim 3, in which two of said second oblique surfaces are provided, each disposed to form an angle of 45 degrees with a normal of a gun barrel axis line of such firearm.

5. An optical sight apparatus for a firearm, comprising a support structure attachable to such firearm; an optical element having a first side disposable towards a user of such firearm, said first side having a concave, parabolic configuration with a predetermined focal point; a light emitting means disposed at said predetermined focal point; said optical element pivotally attached to said support structure and adapted to be pivotal on a cylindrical base member to permit said optical element to be pivotal between a lowered, inoperative position and a raised, operative position; and a U-shaped spring member having a pair of parallel leg portions, said cylindrical base member being rotatable within said U-shaped spring member and having at least one flat surface adapted to engage at least one of said leg portions of said U-shaped spring member to properly position and lock said optical element in said raised operative position.

6. An optical sight apparatus for a firearm, comprising a support structure attachable to such firearm; an optical element contained within a holding means, said optical element having a first side disposable towards a user of such firearm, said first side having a concave, parabolic configuration with a predetermined focal point; a light emitting means disposed at said predetermined focal point, said holding means disposed to extend transversely from a base cylinder rotatably attached to said support structure and adapted to permit said optical element to be pivotal between a lowered, inoperative position and a raised, operative position, said base cylinder being rotatable on axially disposed pivot pins eccentrically displaced in relation to a geometric axis of said base cylinder, and a U-shaped spring having a pair of parallel leg portions adapted to snap into parallel recesses in opposed surfaces of said rotatable base cylinder when said optical element is pivoted to said raised, operative position.

* * * * *